(12) United States Patent
Ashtiani et al.

(10) Patent No.: US 6,481,659 B1
(45) Date of Patent: Nov. 19, 2002

(54) VARIABLE LOAD LIMITING RESTRAINT RETRACTOR

(75) Inventors: Mansour Ashtiani, Beverly Hills, MI (US); Richard P Sickon, Rochester Hills, MI (US); Michael Leslie Oliver, Xenia, OH (US); William Charles Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/544,792

(22) Filed: Apr. 7, 2000

(51) Int. Cl.[7] ............................................... B65H 75/48
(52) U.S. Cl. ..................... 242/379.1; 280/805
(58) Field of Search .......................... 242/379.1, 381; 280/805, 806, 807

(56) References Cited

U.S. PATENT DOCUMENTS

| | | | | |
|---|---|---|---|---|
| 3,765,700 A | * | 10/1973 | Littmann | |
| 3,881,667 A | * | 5/1975 | Tandetzke | 242/379.1 |
| 4,815,674 A | * | 3/1989 | Blake et al. | |
| 5,607,118 A | * | 3/1997 | Dybro et al. | 242/379.1 |
| 5,785,269 A | * | 7/1998 | Miller et al. | 242/379.1 |
| 5,788,281 A | * | 8/1998 | Yanagi et al. | 280/806 |
| 5,887,814 A | * | 3/1999 | Matsuki et al. | 242/379.1 |
| 5,967,441 A | * | 10/1999 | Kohlndorfer et al. | 242/379.1 |
| 6,019,392 A | * | 2/2000 | Karlow | 280/806 |
| 6,213,510 B1 | * | 4/2001 | Suyama | 280/805 |
| 6,237,959 B1 | * | 5/2001 | Hishon | 280/807 |

* cited by examiner

Primary Examiner—William A. Rivera
(74) Attorney, Agent, or Firm—Kathryn A. Marra

(57) ABSTRACT

A variable load limiting restraint retractor for a seat restraint system in a vehicle includes a housing for operative connection to vehicle structure. The variable load limiting restraint retractor also includes a take-up spool operatively connected to the housing and connected to a belt of a seat restraint system for winding and unwinding the belt. The variable load limiting restraint retractor includes a rotatable shaft operatively connected to the take-up spool and the housing, the take-up spool being mounted on the shaft. The variable load limiting restraint retractor further includes a load limiting assembly operatively connected to the shaft for variably limiting load on the belt when the seat restraint system is in a buckled position.

20 Claims, 4 Drawing Sheets

VARIABLE LOAD LIMITING RESTRAINT RETRACTOR

TECHNICAL FIELD

The present invention relates generally to seat restraint systems for vehicles and, more particularly, to a variable load limiting restraint retractor for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a restraint retractor for the seat restraint system. Typically, the restraint retractor has a spool attached to belt webbing of the seat restraint system and is rotatably mounted to the restraint retractor by a shaft. The restraint retractor has a spiral spring on one end of the shaft to urge the spool in a direction for retracting the belt webbing when not in use. Also, the restraint retractor has a toothed locking sprocket on the other end of the shaft and a locking pawl to engage the sprocket to lock the shaft against rotation in the other direction to prevent belt webbing unwinding. The locking sprocket is typically slaved to an acceleration sprocket via a spring and an acceleration pawl is actuated by an acceleration sensing mechanism or sensor. The acceleration sensor includes a mass member or "standing man" that may be spherically shaped or frusto-conical in shape to engage and actuate the acceleration pawl.

The restraint retractor includes a load limiter such as a torque rod providing single (constant) level load limiting. Load leveling means that the restraint retractor will allow controlled belt webbing unwinding or payout. Some attempts have been made to provide a dual load limiter through the use of a torque rod, which only has two settings. Therefore, it is desirable to provide a multiple level or variable load limiting restraint retractor for a seat restraint system in a vehicle. It is also desirable to provide a restraint retractor for a seat restraint system in a vehicle that uses a magnetorheological fluid to provide a variable load limiting effect and, in some cases, a primary locking mechanism for the restraint retractor. It is further desirable to provide a variable load limiting restraint retractor for a seat restraint system in a vehicle that has infinite settings and reduced cost.

SUMMARY OF THE INVENTION

It is, therefore, one object of the present invention to provide a variable load limiting restraint retractor for a seat restraint system in a vehicle.

It is another object of the present invention to provide a variable load limiting restraint retractor for a seat restraint system in a vehicle that uses a magnetorheological fluid.

To achieve the foregoing objects, the present invention is a variable load limiting restraint retractor for a seat restraint system including a housing for operative connection to vehicle structure. The variable load limiting restraint retractor also includes a take-up spool operatively connected to the housing and connected to a belt of a seat restraint system for winding and unwinding the belt. The variable load limiting restraint retractor includes a rotatable shaft operatively connected to the take-up spool and the housing, the take-up spool being mounted on the shaft. The variable load limiting restraint retractor further includes a load limiting assembly operatively connected to the shaft for variably limiting load on the belt when the seat restraint system is in a buckled position.

One advantage of the present invention is that a variable load limiting restraint retractor is provided for a seat restraint system in a vehicle. Another advantage of the present invention is that the variable load limiting restraint retractor uses a magnetorheological fluid to provide multiple or infinite levels of load limiting, which allows for tailoring the load limit or restraint for each occupant, occupant weight and vehicle speed. Yet another advantage of the present invention is that the variable load limiting restraint retractor may provide the primary locking means for a restraint retractor, thus eliminating mechanical components now used to sense and lock the restraint retractor. Still another advantage of the present invention is that the variable load limiting restraint retractor reduces cost by eliminating mechanical components used for the primary locking mechanism, and improve quality by noise reduction due to limited mechanical components.

Other objects, features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
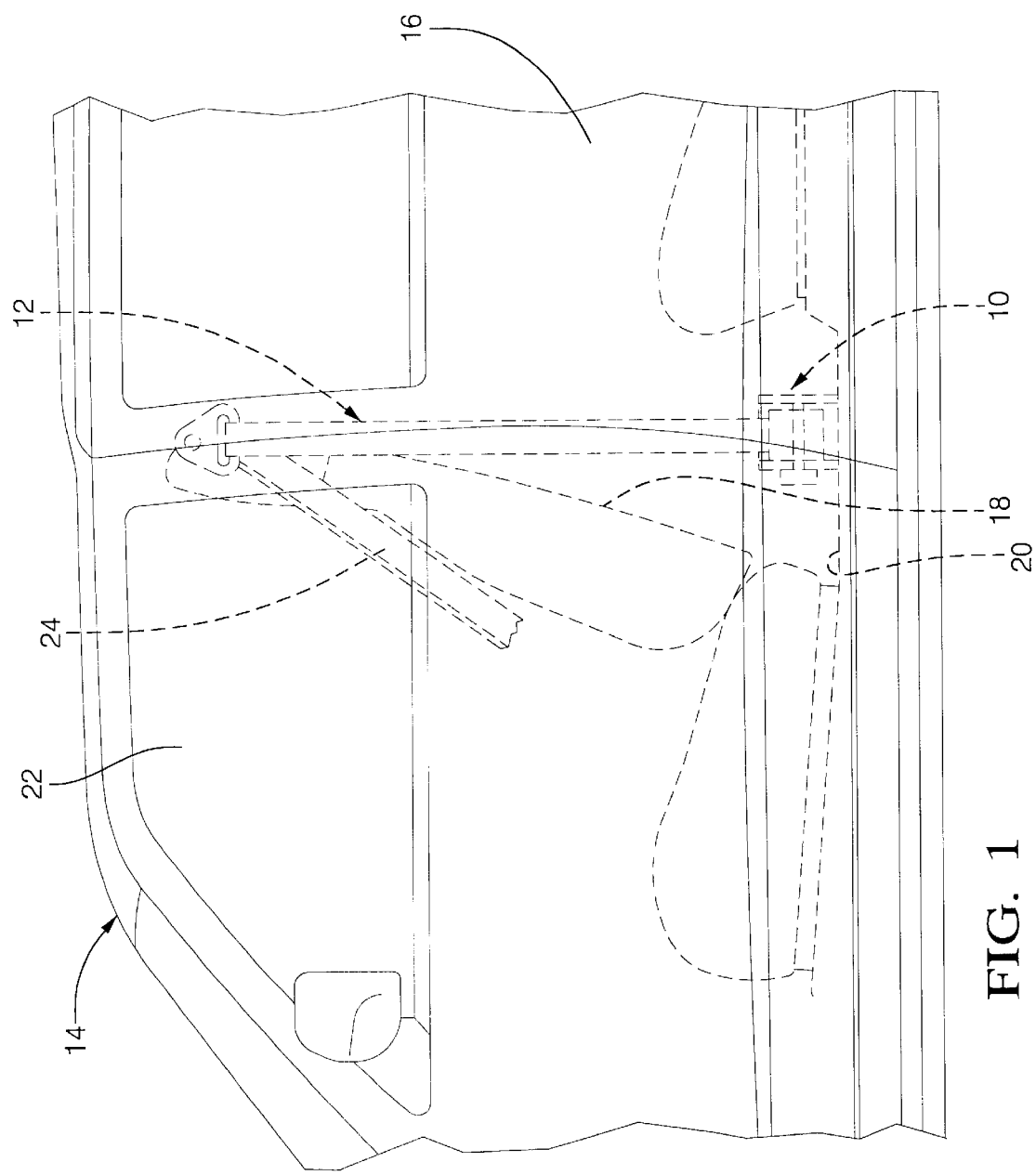
FIG. 1 is a side elevational view of a variable load limiting restraint retractor, according to the present invention, illustrated in operational relationship with a seat restraint system of a vehicle.
Figure 2:
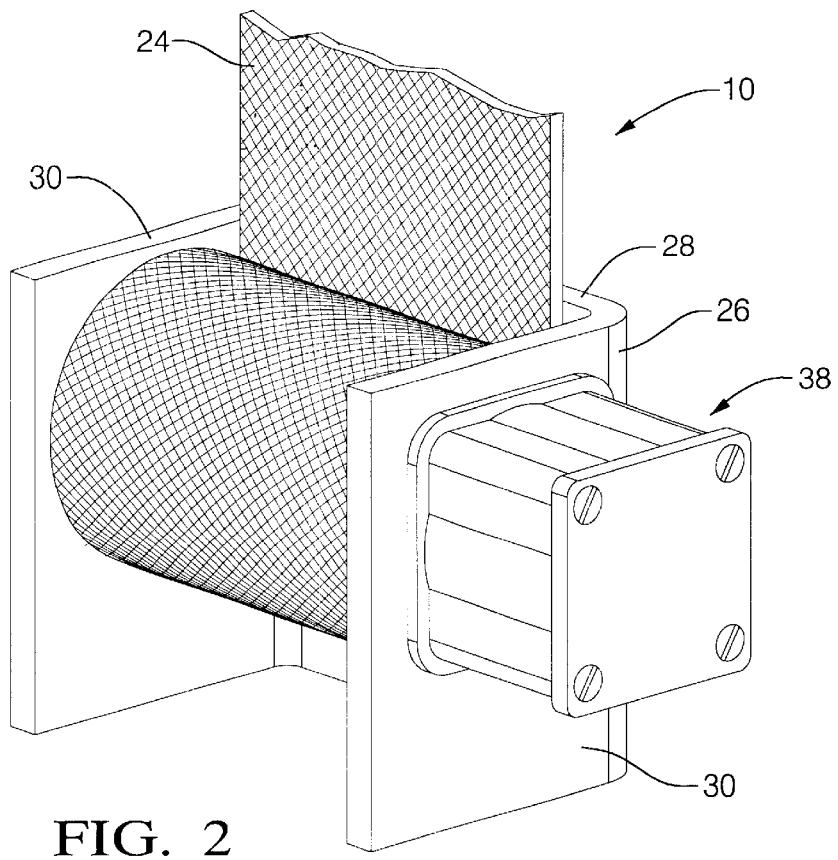
FIG. 2 is a perspective view of the variable load limiting restraint retractor of the seat restraint system of FIG. 1.

Referring to the drawings and in particular FIGS. 1 and 2, one embodiment of variable load limiting restraint retractor 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row or third row seat for the vehicle 14.

The vehicle 14 includes the seat restraint system 12 for restraining an occupant (not shown) in the seat 18. The seat restraint system 12 includes a latch tongue or plate (not shown) connected to an end of either one of a lap belt (not shown), shoulder belt 24, or both which have another end connected to the variable load limiting restraint retractor 10 to be described. The seat restraint system 12 also includes a buckle assembly (not shown) connected by suitable means such as belt webbing (not shown) to the vehicle structure 20. The latch plate is engageable and disengageable with the buckle assembly as is known in the art. It should be appreciated that, except for the variable load limiting restraint retractor 10, the seat restraint system 12 and vehicle 14 are conventional and known in the art.

Figure 2A:
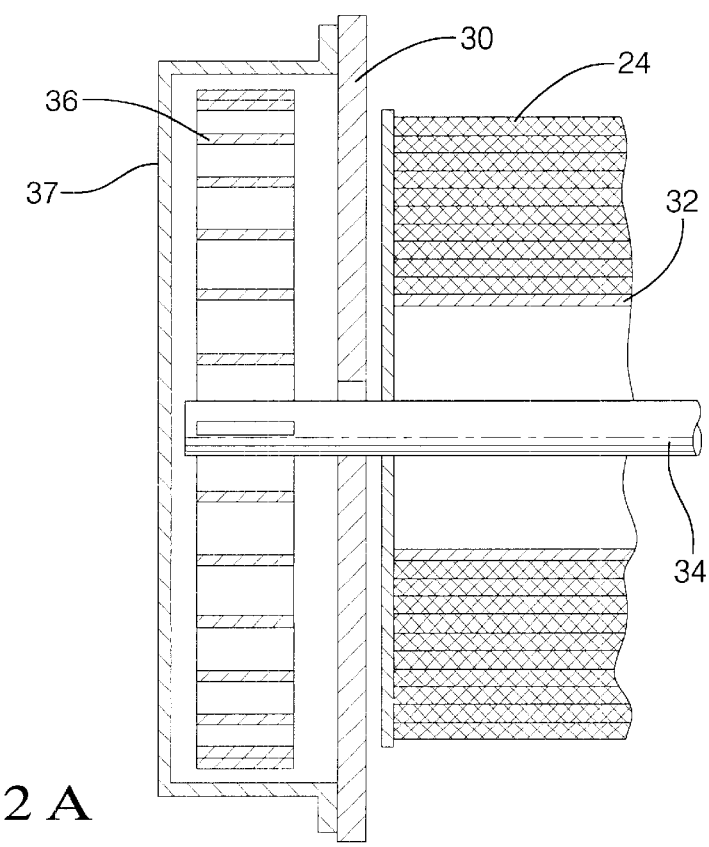
FIG. 2A is a partial fragmentary elevational view of a portion of the variable load limiting restraint retractor of FIG. 2.
Figure 3:
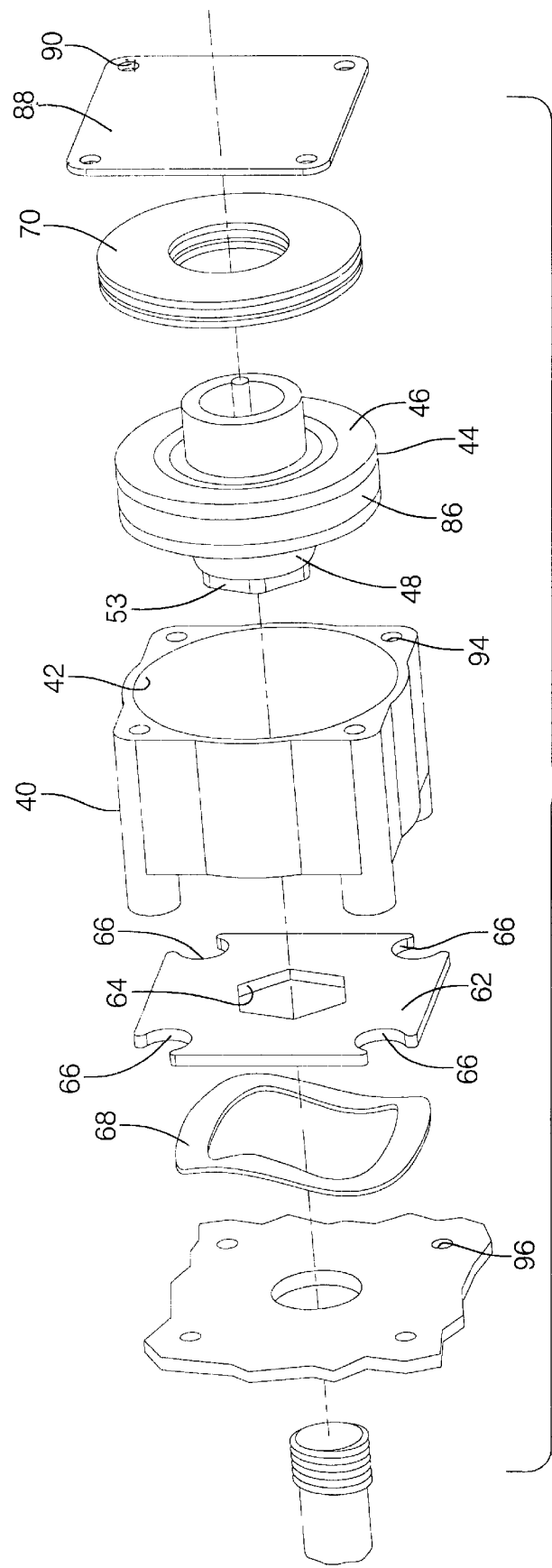
FIG. 3 is an exploded view of another portion of the variable load limiting restraint retractor of FIG. 2.

Referring to FIGS. 2, 2A and 3, the seat restraint system 12 includes the variable load limiting restraint retractor 10 connected to either the lap belt or the shoulder belt 24. In the embodiment illustrated, the variable load limiting restraint retractor 10 is connected to the shoulder belt 24. The variable load limiting restraint retractor 10 includes a housing 26 having a base wall 28 and spaced apart sidewalls 30. The variable load limiting restraint retractor 10 also includes a belt reel or take-up spool 32 disposed between the sidewalls 30 and connected by suitable means to the end of the shoulder belt 24. The variable load limiting restraint retractor 10 also includes a shaft 34 extending through the take-up spool 32 and the sidewalls 30 of the housing 26 such that the take-up spool 32 is rotatable relative to the housing 26. It should be appreciated that the housing 26 is attached by suitable means (not shown) to vehicle structure.

The variable load limiting restraint retractor 10 also includes a retractor spring 36 disposed about one end of the shaft 34. The retractor spring 36 is of a spiral type having one end attached to the shaft 34 and another end connected to the housing 26 as known in the art. The retractor spring 36 may be enclosed by a spring housing 37 attached to the sidewall 30 of the housing 26. The retractor spring 36 has a predetermined torque or tension and urges the shaft 34 in a predetermined direction to wind up the shoulder belt 24 on the take-up spool 32. It should be appreciated that the variable load limiting restraint retractor 10 may have a structure similar to that disclosed in U.S. Pat. No. 4,815,674 to Blake et al.

Figure 4:
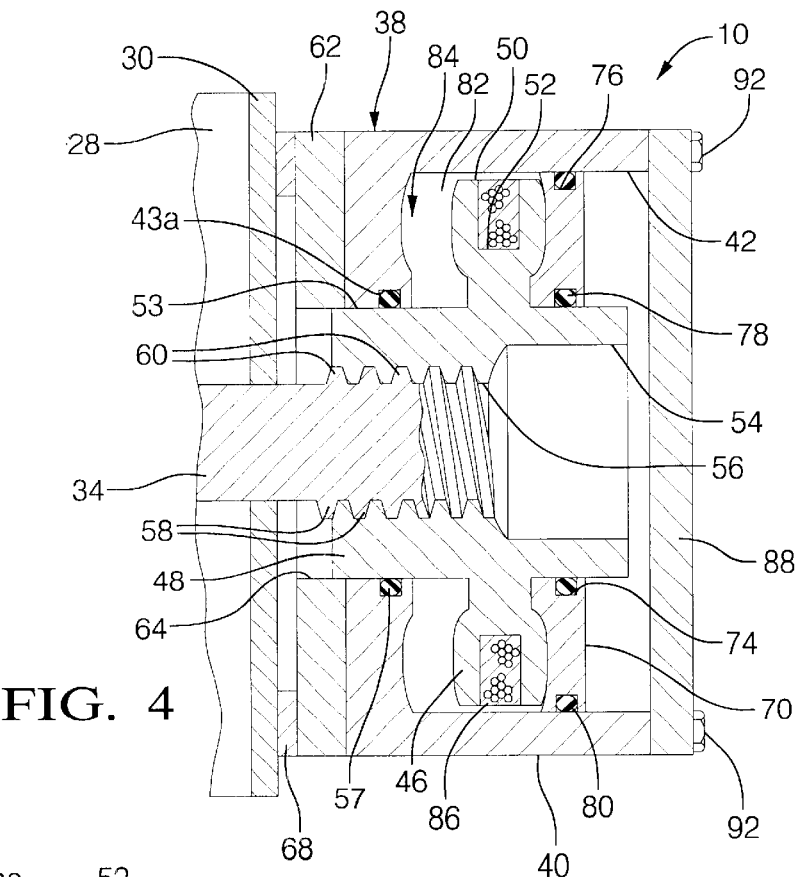
FIG. 4 is a fragmentary elevational view of the portion of the variable load limiting restraint retractor of FIG. 3 illustrating a first operational state.
Figure 5:
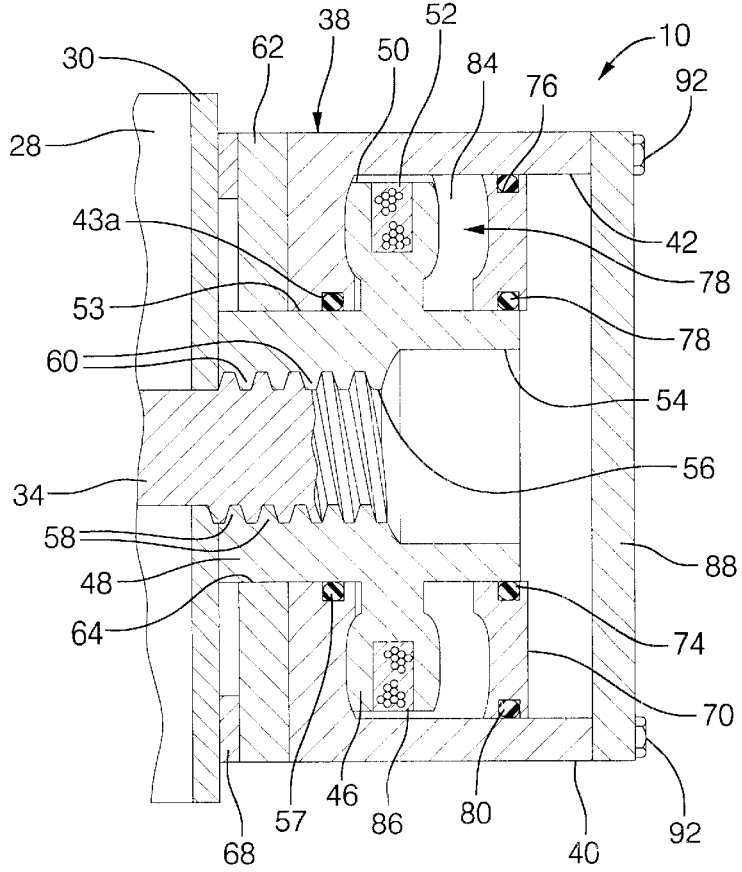
FIG. 5 is a view similar to FIG. 4 illustrating a second operational state of the variable load limiting restraint retractor.

Referring to FIGS. 2 through 4, the variable load limiting restraint retractor 10 also includes a load limiting assembly, generally indicated at 38 attached to the other end of the shaft 34 opposite the spring 36 to allow controlled belt webbing unwinding or payout of the shoulder belt 24. The load limiting assembly 38 includes has a housing 40 extending axially. The housing 40 is generally rectangular in shape, but may have any suitable shape. The housing 40 has a cavity 42 in one axial end and a passageway 43 extending axially through the other axial end and communicating with the cavity 42. The cavity 42 and passageway 43 each have a generally circular cross-sectional shape, but may be any suitable shape. The housing 40 also has an annular groove 43a disposed about the passageway 43. The housing 40 is made of a rigid material such as metal, preferably steel.

The load limiting assembly 38 also includes piston 44 disposed in the housing 40. The piston 44 has a piston portion 46 extending radially and a shaft portion 48 extending axially. The piston portion 46 is generally circular in shape and located axially between the ends of the shaft portion 48. The piston portion 46 is disposed in the cavity 42 of the housing 40 and terminates prior to the wall of the cavity 42 to form a gap or space 50 therebetween for a function to be described. The piston portion 46 also includes an annular groove 52 extending radially inward from an outer periphery thereof for a function to be described. The shaft portion 48 extends axially through the passageway 43 of the housing 40. The outer surface of the shaft portion 48 has a plurality of flats 53 to form a generally hexagonal shape for a function to be described. The shaft portion 48 has a cavity 54 in one axial end and an aperture 56 extending axially from the other axial end and communicating with the cavity 54. The aperture 56 has a plurality of threads 58 for threadably engaging a plurality of threads 60 on one end of the shaft 34. A seal 57 is disposed in the groove 43a of the housing 40 and contacts the shaft portion 48. The piston 44 is made of rigid material such as metal, preferably steel. It should be appreciated that the piston 44 is a monolithic structure being integral, unitary and one-piece.

The load limiting assembly 38 also includes a nut plate 62 disposed between the housing 40 and sidewall 30 to prevent rotational movement of the piston 44. The nut plate 62 is generally rectangular in shape and has an aperture 64 extending therethrough. The aperture 64 has a generally hexagonal shape to receive the hexagonal shape of the shaft portion 48. The nut plate 62 also includes a plurality of recesses 66 at the corners thereof to receive the legs of the housing 40. The recesses 66 cooperate with the legs to prevent the nut plate 62 from rotating relative to the housing 40. The nut plate 62 is made of a rigid material such as metal, preferably steel.

The load limiting assembly 38 includes a spring 68 disposed between the nut plate 62 and the sidewall 30 to urge the nut plate 62 against the housing 40. The spring 68 is of a leaf or wave type and formed as a ring to allow the shaft 34 to pass therethrough.

The load limiting assembly 38 also includes a seal 70 disposed in the cavity 42 of the housing 40 and about the other end of the shaft portion 48. The seal 70 is generally circular in shape and has an aperture 72 extending therethrough. The aperture 72 is generally circular in shape and receives the shaft portion 48. The seal 70 also has an annular inner groove 74 extending radially and circumferentially from the aperture 72. The seal 70 also has an annular outer groove 76 extending radially and circumferentially from the outer periphery thereof. The seal 70 has an inner seal ring 78 disposed in the inner groove 74 to engage the shaft portion 48 and an outer seal ring 80 disposed in the outer groove 76 to engage the wall of the cavity 42. The seal rings 78 and 80 are made of a flexible material such as an elastomeric material. It should be appreciated that the seal 70 forms a chamber 82 in the cavity 42 between the housing 40 and the seal 70 for a function to be described.

The load limiting assembly 38 includes a fluid 84 disposed in the chamber 82. The fluid 84 is of a magnetorheological (MR) type having a suspension of fine, for example in a range of 1 to 50 microns, magnetizable solid in a fluid carrier medium. The MR fluid has a shear stress controlled by an applied magnetic field in which in off state has laminar flow (parabolic velocity profile) and in an ON state has a shear stress greater than a yield stress. Alternatively, the fluid 84 may be of an electro-rheological (ER) type. It should be appreciated that the shear stress of the MR fluid is controlled by an applied magnetic field. It should also be appreciated that such MR fluids and ER fluids are conventional and known.

The load limiting assembly 38 also includes an electrical coil 86 disposed in the groove 52 of the piston 44 to provide the applied magnetic field. The coil 86 is connected to a source of power (not shown) such as an electronic controller of the vehicle. It should be appreciated that the power through the coil 86 creates magnetic flux, which travels through the housing 40 and fluid 84. It should be appreciated that the housing 40 may be made as the coil 86 and the piston 44 made of steel.

The load limiting assembly 38 further includes a cover 88 to cover the end of the cavity 42. The cover 88 is generally rectangular in shape and abuts the end of the housing 40. The cover 88 includes a plurality of apertures 90 extending axially therethrough and disposed near the corners thereof. The cover 88 is made of a rigid material such as metal, preferably steel. The load limiting assembly 38 also includes a plurality of fasteners 92 such as screws extending through the apertures 90 and apertures 94 in the housing 40 and threadably engage apertures 96 in the sidewall 30 to secure the load limiting assembly 38 to the housing 26.

In operation of the variable load limiting restraint retractor 10, an occupant (not shown) grasps the latch plate and pulls on the lap belt and shoulder belt 24. The shoulder belt 24 is unwound by the occupant from the spool 32 of the variable load limiting restraint retractor 10. The occupant engages the latch plate with the buckle assembly to restrain the occupant in the seat 18. When an impact of the vehicle is sensed, power is sent to the coil 86 to apply a magnetic field to the fluid 84, thereby changing its characteristics. As belt webbing is payed-out due to a load on the shoulder belt 24 by the occupant, the shaft 34, which is connected to the spool 32, is rotated. As the shaft 34 rotates, the piston 44 is locked against rotation by the nut plate 62 and translates axially due to the interaction between the threads 58,60. As the piston 44 translates, the piston portion 46 causes the fluid 84 in a first sub-chamber of the chamber 82 to flow around the piston portion 46 through the gap 50 to a second sub-chamber of the chamber 82 on the other side of the piston 44. It should be appreciated that, when energized, the coil 86 creates a magnetic field, which changes the viscosity of the fluid 84, thus creating resistance to motion and controlled belt payout of the shoulder belt 24. It should also be appreciated that the piston 44 moves in a linear manner. It should further be appreciated that operation is reversible very quickly.

The variable load limiting restraint retractor 10 provides variable load limiting by setting the amount of load limiting as a function of the input current profile to the coil 86 as controlled by the electronic controller. Since the fluid viscosity changes with respect to current, the amount of load limiting can be tailored for occupant type and/or vehicle impact. The variable load limiting restraint retractor 10 has a millisecond response time and provides controllable damping and/or clutching. The variable load limiting restraint retractor 10 may replace mechanical locking by placing the load limiting assembly 38 on both sides of the retractor. It should be appreciated that, when the coil 86 is not energized, the variable load limiting restraint retractor 10 functions similar to a conventional retractor to pull in the shoulder belt 24. It should also be appreciated that the load limiting assembly 38 may be configured to be placed inside the spool 32.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A variable load limiting restraint retractor for a seat restraint system in a vehicle comprising:
   a housing for operative connection to vehicle structure;
   a take-up spool operatively connected to said housing and connected to a belt of a seat restraint system for winding and unwinding the belt;
   a rotatable shaft operatively connected to said take-up spool and said housing, said take-up spool being mounted on said shaft; and
   a load limiting assembly including a rotatable piston operatively connected to said shaft for rotation with said shaft and for translating in a linear manner when an impact of the vehicle is sensed, a fluid cooperating with said piston, and an electrical coil for applying a magnetic field to said fluid to change a viscosity of said fluid for variably limiting load on the belt when the seat restraint system is in a buckled position.

2. A variable load limiting restraint retractor as set forth in claim 1 wherein said load limiting assembly includes a housing and said piston being disposed within said housing for cooperating with said shaft.

3. A variable load limiting restraint retractor as set forth in claim 2 wherein said fluid is either one of a magnetorheological (MR) fluid and electrorheological (ER) fluid disposed in said housing and cooperating with said piston.

4. A variable load limiting restraint retractor as set forth in claim 3 wherein said electrical coil is disposed in said housing and connected to a source of power.

5. A variable load limiting restraint retractor as set forth in claim 2 wherein said load limiting assembly includes a plate member cooperating with said housing and said piston to prevent rotation of said piston.

6. A variable load limiting restraint retractor as set forth in claim 2 wherein housing includes a cavity in one axial end and a passageway extending axially through another axial end and communicating with said cavity.

7. A variable load limiting restraint retractor for a seat restraint system in a vehicle comprising:
   a housing for operative connection to vehicle structure;
   a take-up spool operatively connected to said housing and connected to a belt of a seat restraint system for winding and unwinding the belt;
   a rotatable shaft operatively connected to said take-up spool and said housing, said take-up spool being mounted on said shaft;
   a load limiting assembly operatively connected to said shaft for variably limiting load on the belt when the seat restraint system is in a buckled position;
   said load limiting assembly including a housing and a piston disposed within said housing for cooperating with said shaft;
   said housing including a cavity in one axial end and a passageway extending axially through another axial end and communicating with said cavity; and
   said piston comprising a piston portion disposed in said cavity and extending radially to a wall of said cavity to form a gap therebetween and a shaft portion extending axially from said piston portion and through said passageway.

8. A variable load limiting restraint retractor as set forth in claim 7 wherein said shaft portion has an aperture extending therein and a plurality of first threads disposed about said aperture.

9. A variable load limiting restraint retractor as set forth in claim 8 wherein said shaft includes a plurality of second threads for threadably engaging said first threads.

10. A variable load limiting restraint retractor as set forth in claim 7 wherein said load limiting assembly includes a seal disposed in said cavity and about said shaft portion to form a chamber.

11. A variable load limiting restraint retractor as set forth in claim 7 wherein said load limiting assembly includes a seal disposed between said housing and said shaft portion.

12. A variable load limiting restraint retractor for a seat restraint system in a vehicle comprising:

- a retractor housing for operative connection to vehicle structure;
- a take-up spool operatively connect ed to said retractor housing and connected to a belt of a seat restraint system for winding and unwinding the belt;
- a rotatable shaft operatively connected to said take-up spool and said retractor housing, said take-up spool being mounted on said shaft; and
- a load limiting assembly including a rotatable piston operatively connected to said shaft for rotation with said shaft and for translating in a linear manner when an impact of the vehicle is sensed, either one of a magnetorheological (MR) fluid and electrorheological (ER) fluid cooperating with said piston, and an electrical coil for applying a magnetic field to said fluid to increase a viscosity of said fluid for variably limiting load on the belt during the impact.

13. A variable load limiting restraint retractor as set forth in claim 12 wherein said load limiting assembly includes a load limiting housing and said piston being disposed within said load limiting housing for cooperating with said shaft, said fluid being disposed in a chamber of said load limiting housing and cooperating with said piston.

14. A variable load limiting restraint retractor as set forth in claim 13 wherein said electrical coil is disposed in said load limiting housing and connected to a source of power.

15. A variable load limiting restraint retractor as set forth in claim 13 wherein said load limiting assembly includes a plate member cooperating with said piston to prevent rotation of said piston and cooperating with said load limiting housing to prevent rotation of said plate member.

16. A variable load limiting restraint retractor as set forth in claim 15 including a spring disposed between said retractor housing and said load limiting housing to urge said plate member against said load limiting housing.

17. A variable load limiting restraint retractor as set forth in claim 13 wherein load limiting housing includes a cavity in one axial end and a passageway extending axially through another axial end and communicating with said cavity.

18. A variable load limiting restraint retractor for a seat restraint system in a vehicle comprising:

- a retractor housing for operative connection to vehicle structure;
- a take-up spool operatively connected to said retractor housing and connected to a belt of a seat restraint system for winding and unwinding the belt;
- a rotatable shaft operatively connected to said take-up spool and said retractor housing, said take-up spool being mounted on said shaft;
- a load limiting assembly operatively connected to said shaft including either one of a magnetorheological (MR) fluid and electrorheological (ER) fluid for variably limiting load on the belt when the seat restraint system is in a buckled position;
- said load limiting assembly including a load limiting housing and a piston disposed within said load limiting housing for cooperating with said shaft, said fluid being disposed in a chamber of said load limiting housing and cooperating with said piston;
- said load limiting housing including a cavity in one axial end and a passageway extending axially through another axial end and communicating with said cavity; and
- said piston comprising a piston portion disposed in said cavity and extending radially to a wall of said cavity to form a gap therebetween and a shaft portion extending axially from said piston portion and through said passageway.

19. A variable load limiting restraint retractor as set forth in claim 18 wherein said shaft portion has an aperture extending therein and a plurality of first threads disposed about said aperture and said shaft includes a plurality of second threads for threadably engaging said first threads.

20. A seat restraint system for a vehicle comprising:

- a belt for restraining an occupant in the vehicle;
- a variable load limiting restraint retractor for operative connection to the vehicle and connected to said belt for winding and unwinding the belt;
- said variable load limiting restraint retractor comprising a retractor housing, a take-up spool operatively connected to said retractor housing and connected to said belt;
- a rotatable shaft operatively connected to said take-up spool; and
- a load limiting assembly including a rotatable piston operatively connected to said shaft for rotation with said shaft and for translating in a linear manner when an impact of the vehicle is sensed, a fluid cooperating with said piston, and an electrical coil for applying a magnetic field to said fluid to change a viscosity of said fluid for variably limiting load on the belt during the impact.

* * * * *